(12) United States Patent
Stueck et al.

(10) Patent No.: US 6,591,597 B1
(45) Date of Patent: Jul. 15, 2003

(54) SCRAPPING PLATE FOR A COTTON HARVESTER

(75) Inventors: Scott F. Stueck, Ankeny, IA (US); Jeffrey Robert Fox, Minburn, IA (US); Timothy Arthur Deutsch, Newton, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/179,728

(22) Filed: Jun. 25, 2002

(51) Int. Cl.$^7$ .............................................. A01D 46/18
(52) U.S. Cl. ................................................ 56/41; 56/50
(58) Field of Search ................................ 56/28, 33, 41, 56/42, 43, 44, 45, 46–50, 12.1

(56) References Cited

U.S. PATENT DOCUMENTS 5,355,663 A * 10/1994 Deutsch et al. ............... 56/12.1
6,293,078 B1 * 9/2001 Deutsch et al. ................ 56/44
6,415,589 B1 * 7/2002 Yribarren et al. ............... 56/41

OTHER PUBLICATIONS

Picture of a commercially available John Deere scrapping plate.

* cited by examiner

Primary Examiner—Robert E. Pezzuto

(57) ABSTRACT

A scrapping plate for improving cotton picker efficiency incorporate an angle in the bottom profile which forces cotton into the spindle before being released from the picking zone. The scrapping plate ribs which are spaced vertically from each other and located between adjacent rows of spindles are tapered so that rib surfaces are generally parallel to the spindle tapered surfaces in the picking zone. The parallel arrangement places cotton equidistant from the spindle along the length of the picking zone. In one embodiment, the ribs are tapered in the fore-and-aft direction to better hold cotton bolls in the picking zone. The forward portion of alternating ribs can also be terminated rearwardly of the leading portion of the plate to allow the cotton bolls to gather more easily.

15 Claims, 6 Drawing Sheets

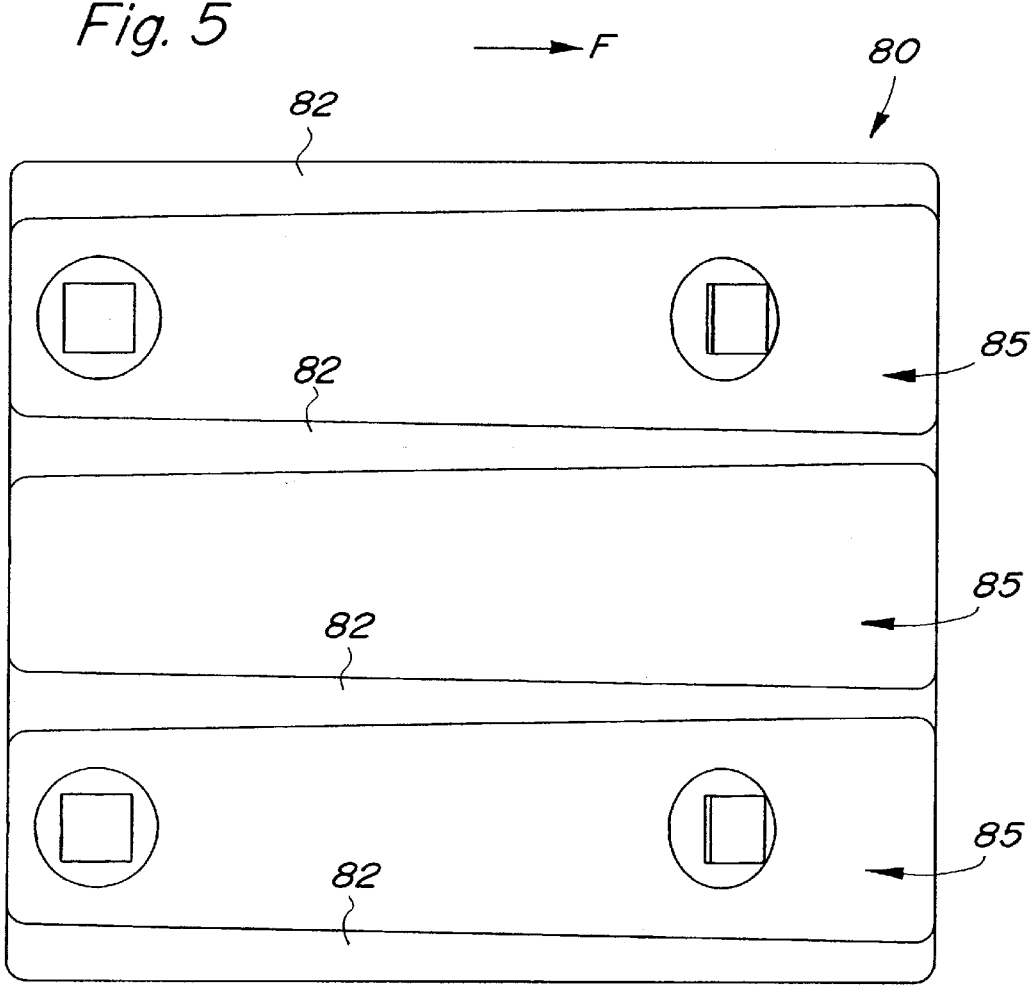
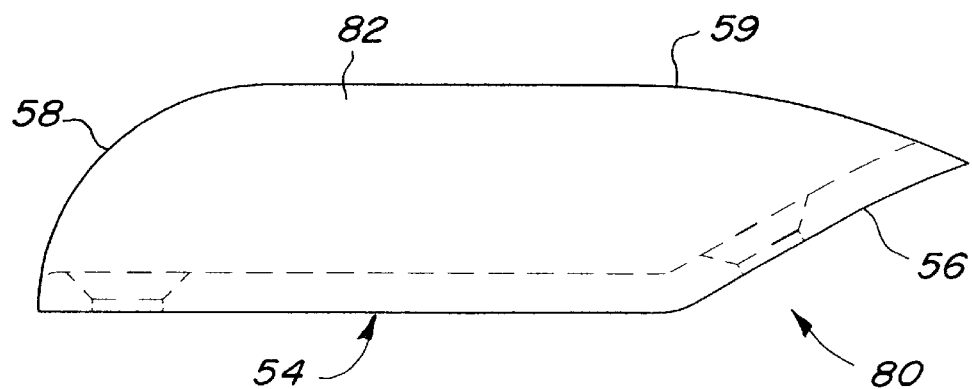

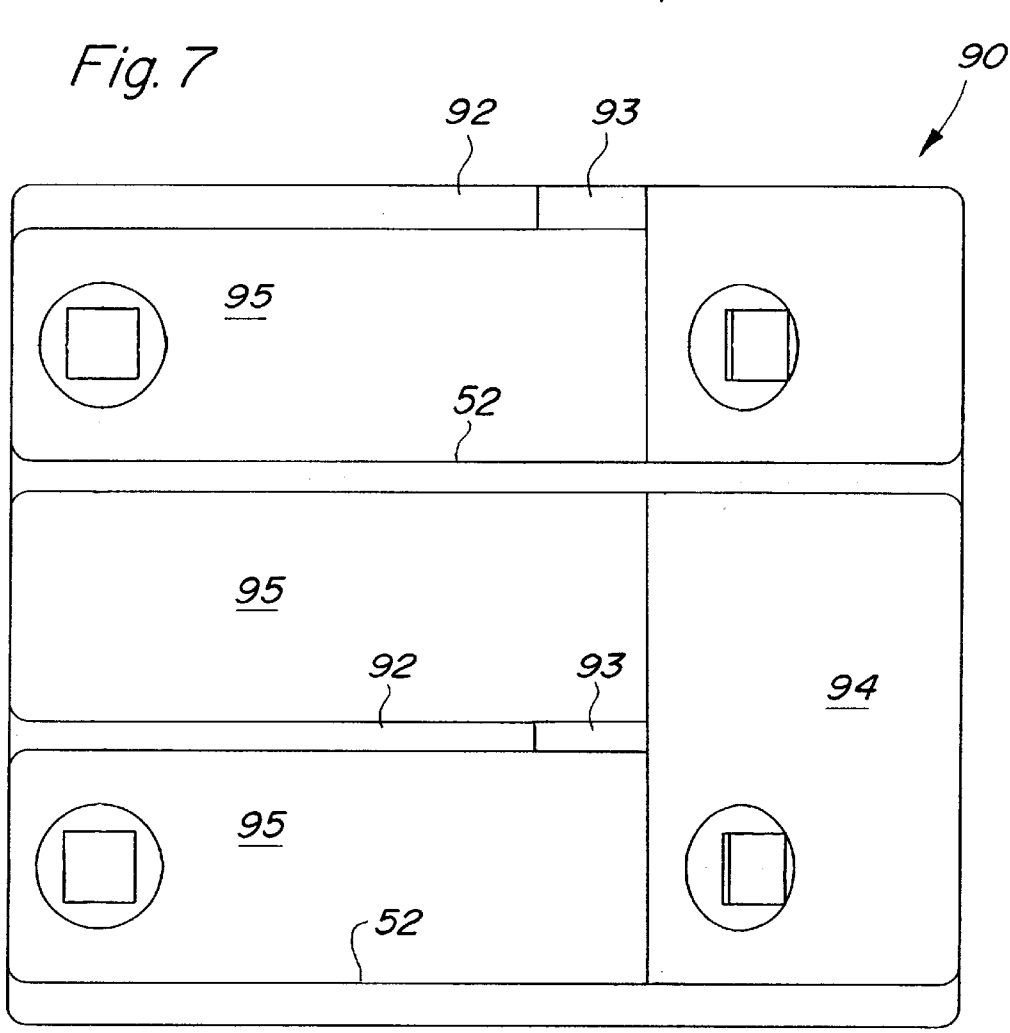
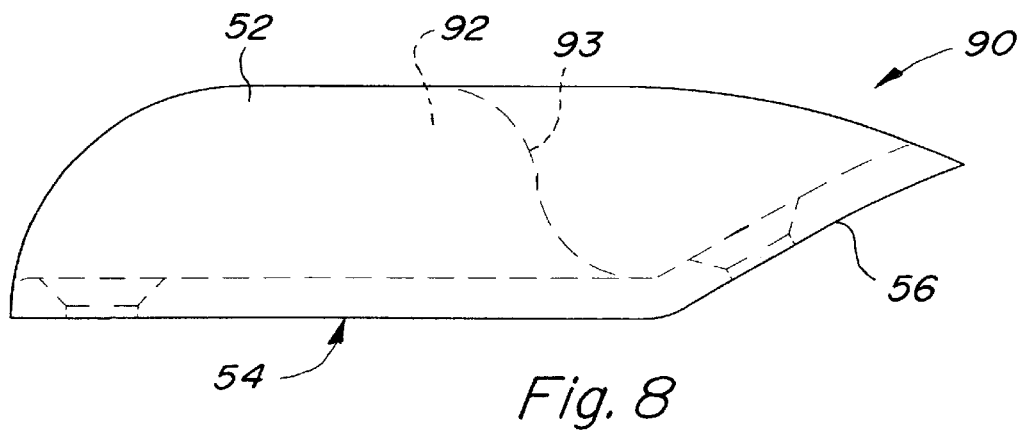

SCRAPPING PLATE FOR A COTTON HARVESTER

BACKGROUND OF THE INVENTION

1. Field of the Invention

The present invention relates generally to spindle-type cotton harvesters and, more specifically, to a scrapping plate for forcing cotton into the spindles.

2. Related Art

Cotton harvesters include rotating spindles which project into the plant row and remove cotton from the plants. The rearward velocity of the spindles is synchronized with the forward speed of harvester to generally provide zero relative velocity between the spindles and the cotton plants while the spindles project into the plants. To help assure contact with cotton bolls intermediate adjacent spindles, scrapping plates are placed adjacent the spindles in the picking zone to slow the intermediate bolls and force them into contact with the next spindles. With such plates, typical picking efficiency is in a range from approximately 97 to 98 percent. Increasing efficiency beyond that range has been a continuing source of difficulty. There is a need to better assure that the intermediate bolls are forced into contact with the spindles so those bolls are not left on the plant and picking efficiency is increased. The efficiency must be increased without inhibiting plant movement through the picking zone so that harvest speed can be maintained for good machine productivity.

BRIEF DESCRIPTION OF THE INVENTION

It is therefore an object of the present invention to provide an improved scrapping plate for a cotton harvester. It is a further object to provide such a plate which overcomes the aforementioned problems.

It is another object to provide an improved cotton harvester scrapping plate which increases picking efficiency over at least most previously available scrapping plates. It is yet a further object to provide such a plate which does not significantly inhibit plant movement through the harvest zone so that machine productivity can be maintained or improved.

It is a further object of the invention to provide an improved scrapping plate which maintains the cotton in the picking zone longer for improved picking efficiency. It is yet another object to provide such a plate which includes ribs with a taper that helps to wedge and slow intermediate cotton bolls.

Accordingly, a scrapping plate constructed in accordance with the teachings of the present invention includes channel areas with tapered or narrowing structure to provide better contact between the spindles and cotton. In one embodiment, the rear or trailing portion of the scrapping plate incorporates an angle in the bottom profile which forces cotton into the spindle before being released. The scrapping plate ribs which are spaced vertically from each other and located between adjacent rows of spindles are tapered so that rib surfaces are generally parallel to the spindle tapered surfaces in the picking zone. The parallel arrangement places cotton equidistant from the spindle along the length of the picking zone.

In other various aspects of the invention, the ribs can be tapered in the fore-and-aft direction to better hold the intermediate cotton bolls in the scrapping plate for a period of time sufficient for the cotton to be picked by the trailing spindle. To provide better entry of the cotton into the area between the scrapping plate ribs, the forward portion of alternating ribs can be terminated rearwardly of the leading portion of the plate. The wider opening at the leading portion of the plate allows the cotton bolls to gather more easily into the depth of the pockets formed between the ribs before the dividing ribs open the bolls and bring the cotton closer to the spindles.

These and other objects, features and advantages of the present invention will become apparent to one skilled in the art upon reading the following detailed description in view of the drawings.

BRIEF DESCRIPTION OF THE DRAWINGS

FIG. 5 is a top view of an improved scrapping plate having a fore-and-aft taper.

FIG. 6 is an end view of the scrapping plate of FIG. 5.

FIG. 7 is a top view of another embodiment of a scrapping plate for improving cotton boll gathering at the leading portion of the plate.

FIG. 8 is an end view of the scrapping plate of FIG. 7.

DETAILED DESCRIPTION OF THE DRAWINGS

Figure 1:
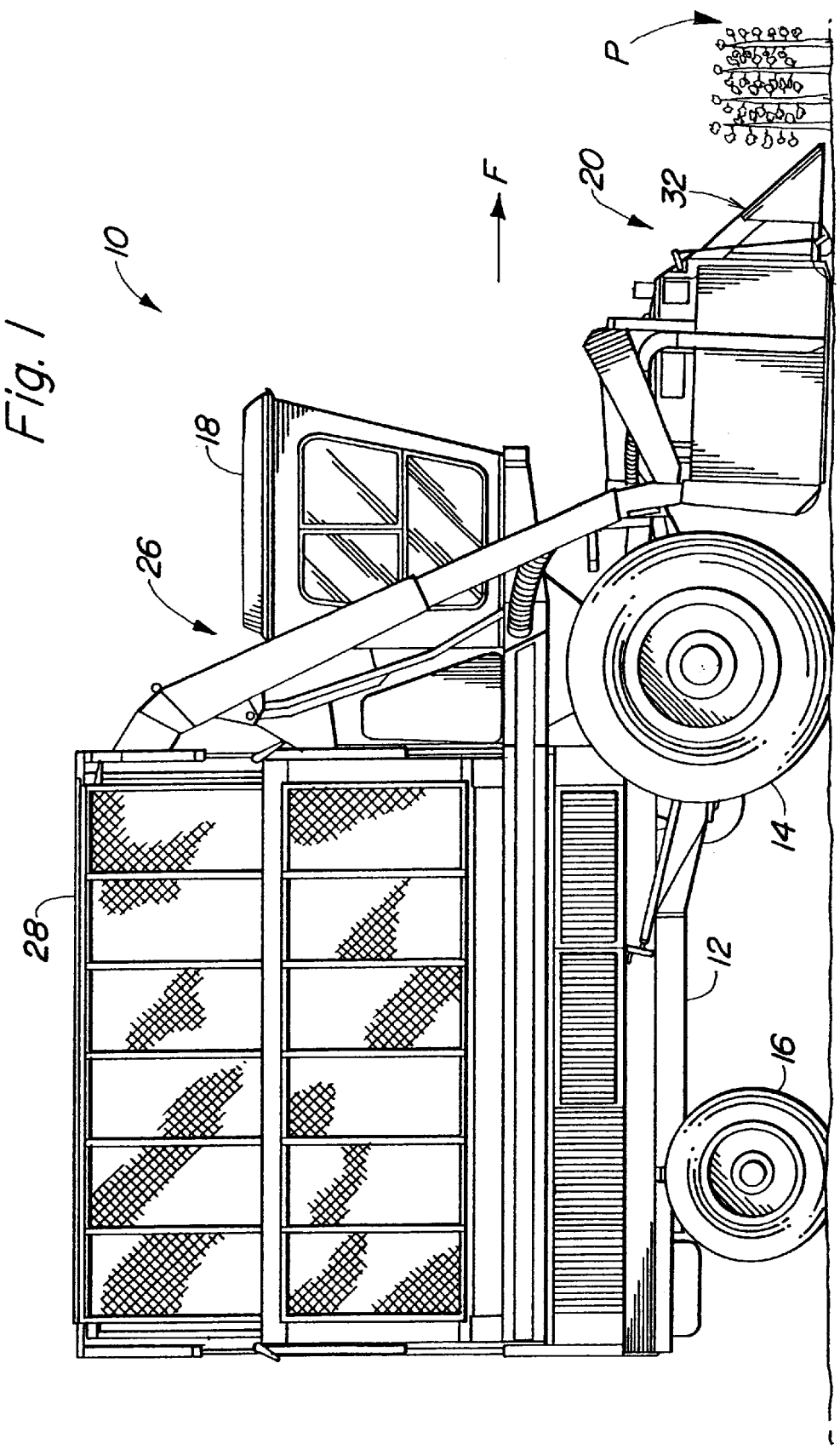
FIG. 1 is a side view of a cotton picker.

Referring now to FIG. 1, therein is shown a cotton harvester 10 having a main frame 12 supported for forward movement F over a field of cotton plants P by forward drive wheels 14 and rear steerable wheels 16. The harvester 10, with the exception of the improved scrapping plate structure described below, may be generally of the type exemplified by the John Deere Model 9976 Cotton Picker. The harvester 10 includes a cab 18. Transversely spaced row units 20 are supported from the forward end of the frame 12 for removing cotton from the plants. Removed crop is directed upwardly and rearwardly through an air duct system 26 and to a cotton basket or receptacle 28 located behind the cab 18.

The row units 20 each include stalk lifters 32 defining a forward row receiving area which directs cotton plants into a harvest zone 36 in the unit. Columns 40c of spindles 40 are supported for rotation in the harvest zone and are moved rearwardly (broken arrows of FIGS. 2 and 3) at the forward speed of the harvester 10 so that the velocity of the spindles relative to the plant is approximately zero. As can be appreciated from FIGS. 2 and 3, cotton bolls intermediate the fore-and-aft spaced adjacent spindles 40 can be out of contact with the tapered picking surface on the spindles.

Prior Art

Figure 2:
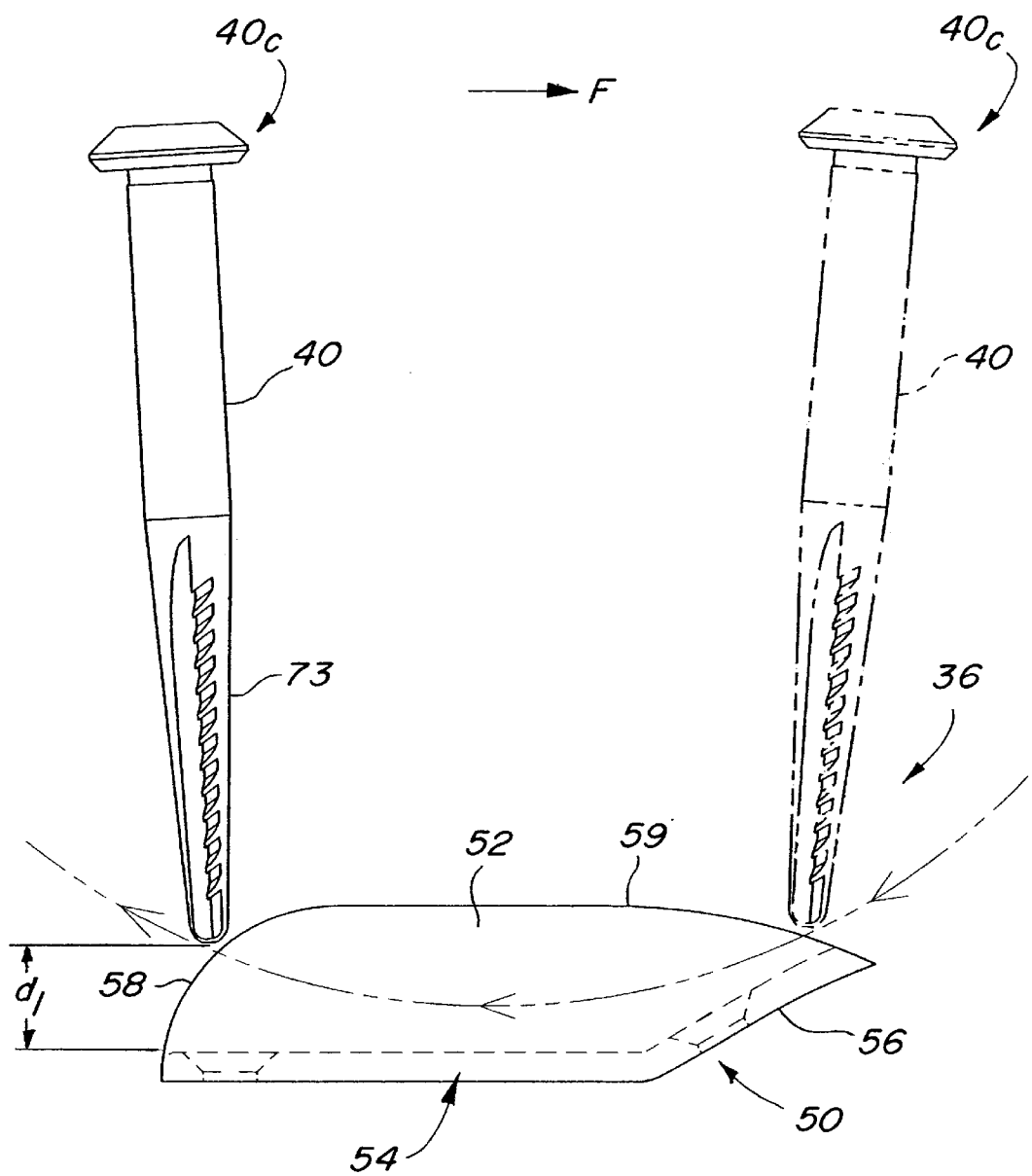
FIG. 2 is a top view of a portion of the harvest zone of the picker of FIG. 1 showing a scrapping plate typical of the prior art.
Figure 3:
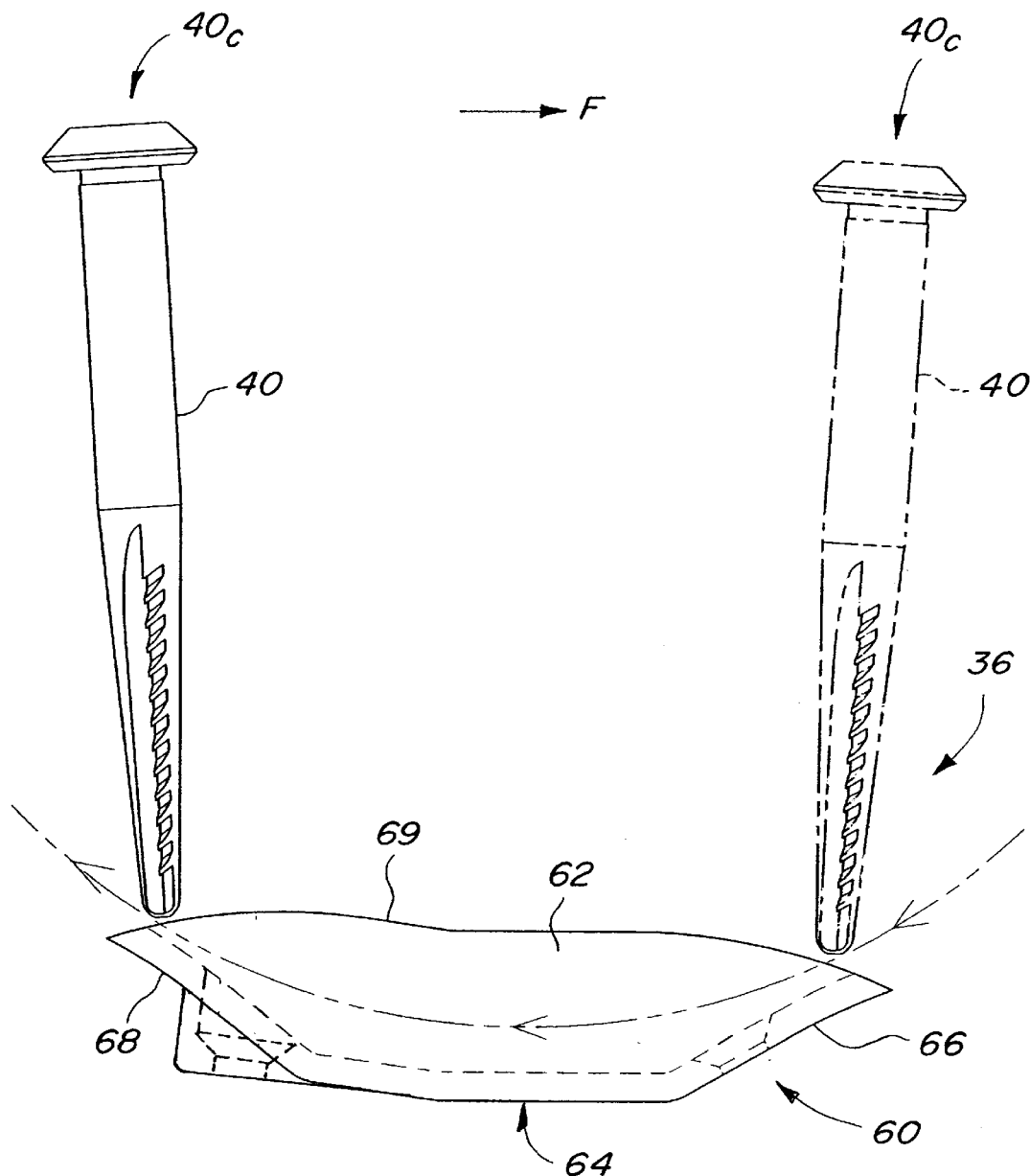
FIG. 3 is a view similar to FIG. 2 but showing an improved scrapping plate.

FIG. 2 shows a conventional scrapping plate 50 for slowing intermediate cotton bolls so that more of such bolls will be opened and engaged by the spindles 40. The conventional plate 50 includes a plurality of ribs 52 with sides parallel to each other and extending into the zone 36 between the ends of the spindles 40. The ribs 52 are supported from a base portion 54 with a forward angle 56 which brings the base portion closely adjacent the path of the spindle tips. The base portion 54 is apertured to accommodate a bolt or similar connection to the row unit frame. The plate 50 opens relatively freely in the rearward direction, and the spindle tip is offset a substantial distance (see d1 of FIG. 2) from the base portion 54. The ribs 52 include trailing ends 58 which curve downwardly and rearwardly from a top edge 59 of the ribs to the base portion 54.

The Improved Scrapping Plate

To increase picking efficiency, an improved scrapping plate 60 (FIG. 3) is provided which helps to better force cotton into the spindles 40 before being released from the plate. The improved plate 60 includes a plurality of vertically spaced ribs 62 extending into the zone 36 between the ends of the spindles 40. The ribs 62 are supported from a base portion 64 which also includes a forward angle 66. The plate 60 does not open as freely in the rearward direction as the prior art embodiment of FIG. 2, but rather includes a rear angle 68 which maintains the cotton in the picking zone longer and helps force the cotton onto, the spindle 40. As the spindle 40 exits the plate area, the spindle tip is closely adjacent the base portion 64. The ribs 62 include a top edge 69 which is substantially fore-and-aft and extends between the leading portion of the angle 66 and the trailing portion of the angle 68. The top edge 69 is formed from two slightly arcuate portions joined at an intermediate location on the rib 62.

Figure 4:
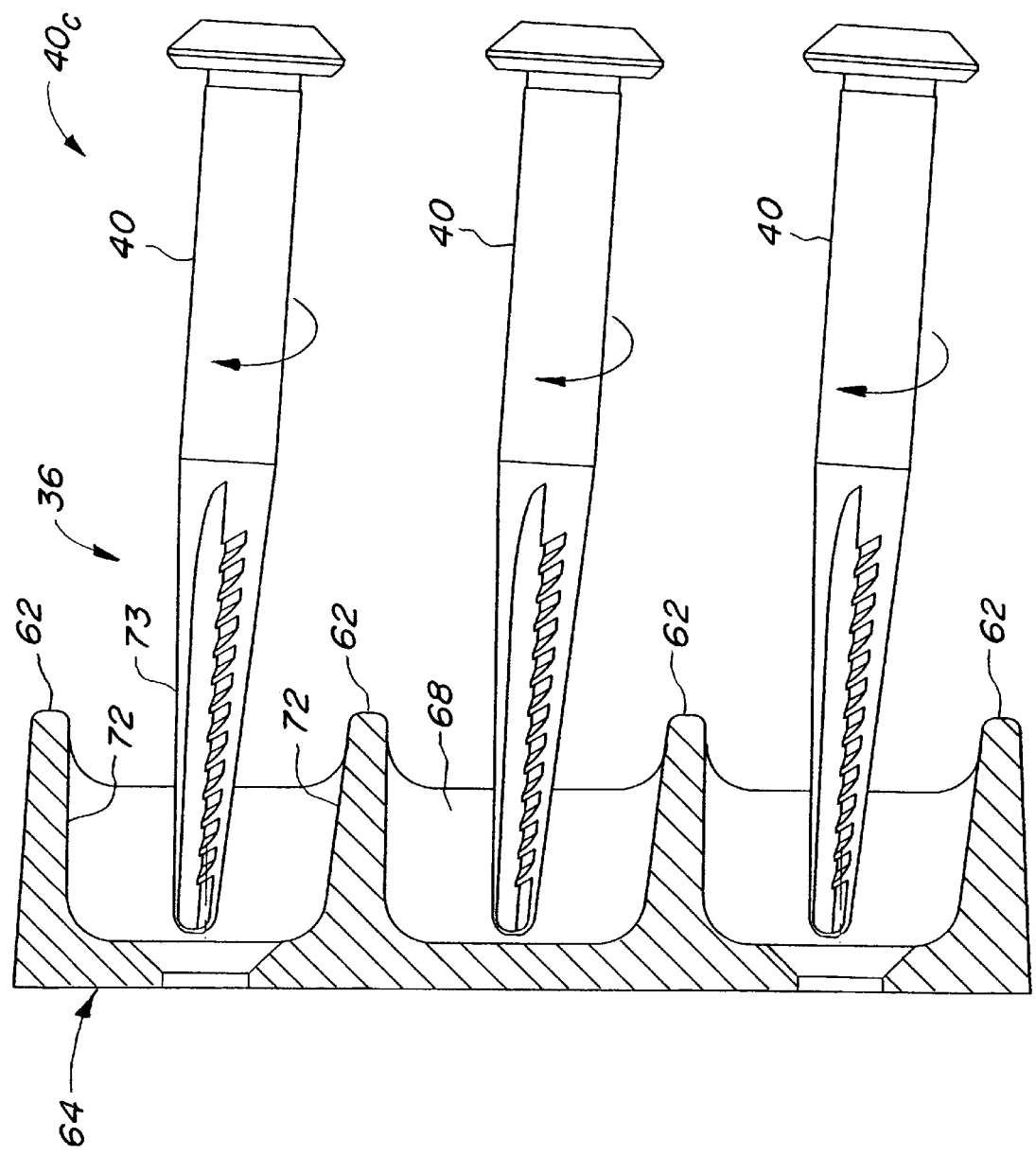
FIG. 4 is a front view, partially in section of an improved scrapping plate having a tapered wall feature.

To prevent intermediate bolls from squeezing by the scrapping plate 64 and thereby further improve picking efficiency, the ribs 62 can be fabricated having tapered walls 72 (FIG. 4) which preferably lie substantially parallel to the tapered picking surface 73 of the spindles 40. The cotton is placed at an equal distance from the tapered picking surface 73 along the length of the picking zone of the spindle 40. The tapered walls 72 also provide a slight wedging action for the bolls so that the intermediate bolls are opened and slowed more effectively for contact with the trailing spindle.

In another embodiment of the invention, a scrapping plate 80 with a fore-and-aft fin taper as exemplified in FIG. 5 may be provided. As shown, the scrapping plate 80 has a side profile similar to that of the prior art plate 50 of FIG. 2. However, fins 82 supported from the base portion 54 increase in thickness from the leading end to the trailing end of the plate so that channels 85 defined between the fins taper and narrow in the direction of cotton movement through the picking zone. The taper holds the intermediate cotton just long enough to be picked by the trailing spindle 40.

A further modification shown in a scrapping plate 90 of FIGS. 7 and 8 may be utilized alone or in combination with one or more of the above-described scrapping plate features to improve cotton boll gathering at the leading portion of the plate. As shown in FIG. 7, the scrapping plate 90 has a profile similar to that of the plate 50 of FIG. 2. However, alternating ribs 92 between the conventional ribs 52 do not extend to the leading portion of the plate 90 but terminate just rearwardly of the forward angle 56. Each of the ribs 92 includes a reverse curved front edge 93 extending from the base portion 54 to the top edge of the ribs providing a smooth transition from double pocket (94) to single pocket (95) boll opening areas which bring the cotton closer to the corresponding spindles 40.

Having described the preferred embodiment, it will become apparent that various modifications can be made without departing from the scope of the invention as defined in the accompanying claims. For example, the several improvement features described above may each be used alone or in combination with any or all of the remaining features, depending on the cotton and harvest conditions and operator preferences.

We claim:

1. A scrapping plate for a spindle type cotton harvester row unit having vertically spaced spindles moveable through a harvest zone in contact with cotton plants, the plate including a base, ribs extending from the base and defining channel areas from a leading end to a trailing end of the plate for receiving picking surfaces of spindles therebetween in the harvest zone and directing cotton against the spindle, wherein the base includes an angle at the trailing end of the plate for forcing the cotton into the spindle as the spindle exits the channel areas.

2. The scrapping plate as set forth in claim 1 wherein the ribs include tapered walls lying generally parallel to the surfaces of the spindles.

3. The scrapping plate as set forth in claim 1 wherein the ribs taper inwardly in the direction from the leading end to the trailing end to hold cotton sufficiently to engage the spindles before the spindles exit from the trailing end of the plate.

4. The scrapping plate as set forth in claim 1 wherein at least one of the ribs terminates rearwardly of the leading end of the plate to open the leading end of the plate for easier entry of the cotton into the channel areas.

5. A scrapping plate for a spindle type cotton harvester row unit having vertically spaced spindles moveable through a harvest zone in contact with cotton plants, the plate including a base, ribs extending from the base and defining channel areas from a leading end to a trailing end of the plate for receiving picking surfaces of spindles therebetween in the harvest zone and directing cotton against the spindle, wherein channel areas taper inwardly from the leading end towards the trailing end to hold cotton for engagement with the spindles.

6. The scrapping plate as set forth in claim 5 wherein the base includes an angle at the trailing end of the plate for forcing the cotton into the spindle as the spindle exits the channel areas.

7. The scrapping plate as set forth in claim 6 wherein the ribs include an upper edge and the ribs widen from the upper edge to the base so that the channels narrow from the upper edge to the base.

8. The scrapping plate as set forth in claim 5 wherein the spindle is approximately the same distance from the base at the leading end and at the trailing end of the plate.

9. A scrapping plate for a spindle type cotton harvester row unit having vertically spaced spindles with support ends and opposite picking tip ends and moveable through a harvest zone in contact with cotton plants, the plate including a base, ribs extending from the base to an upper edge and defining channel areas from a leading end to a trailing end of the plate for receiving the picking tip ends of the spindles and directing cotton against the spindle, wherein the plate includes means providing a narrowing structure for forcing the cotton into the spindle prior to the spindle exiting the channel areas.

10. The scrapping plate as set forth in claim 9 wherein the means providing the narrowing structure includes rib sidewalls increasing in thickness from the upper edge towards the base.

11. The scrapping plate as set forth in claim 9 wherein the means providing the narrowing structure comprises opposed rib walls tapering inwardly towards each other in the direction from the leading end to the trailing end and holding cotton for engagement with the spindles before the spindles exit from the trailing end of the plate.

12. The scrapping plate as set forth in claim 9 wherein at least one of the ribs terminates rearwardly of the leading end of the plate to open the leading end of the plate for easier entry of the cotton into the channel areas.

13. The scrapping plate as set forth in claim 9 wherein the means providing the narrowing structure comprises a base angle at the trailing end of the plate, the base angle forcing the cotton onto the spindle prior to the spindle exiting the trailing end of the plate.

14. The scrapping plate as set forth in claim 9 wherein the means providing the narrowing structure comprises at least one rib terminated rearwardly of the leading end and rearwardly of an adjacent rib so that at least two of the channels have a common forward opening.

15. The scrapping plate as set forth in claim 10 wherein the sidewalls are parallel to a surface of the picking tip end.

\* \* \* \* \*